(12) United States Patent
Metwaly et al.

(10) Patent No.: US 11,941,081 B2
(45) Date of Patent: Mar. 26, 2024

(54) SYSTEMS AND METHODS FOR TRAINING A STYLE MODEL

(71) Applicant: Toyota Motor Engineering & Manufacturing North America, Inc., Plano, TX (US)

(72) Inventors: Kareem Metwaly, State College, PA (US); Rui Guo, San Jose, CA (US); Xuewei Qi, Dublin, CA (US); Kentaro Oguchi, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 317 days.

(21) Appl. No.: 17/351,755

(22) Filed: Jun. 18, 2021

(65) Prior Publication Data
US 2022/0405530 A1    Dec. 22, 2022

(51) Int. Cl.
*G06F 18/214*   (2023.01)
*G06F 18/21*    (2023.01)
*G06N 20/00*    (2019.01)
*G06V 20/56*    (2022.01)

(52) U.S. Cl.
CPC .......... *G06F 18/214* (2023.01); *G06F 18/217* (2023.01); *G06N 20/00* (2019.01); *G06V 20/56* (2022.01)

(58) Field of Classification Search
CPC ................ G06T 5/008; G06T 15/506; G06T 2207/20081; G06T 2207/20084; G06F 18/214; G06F 18/217; G06N 20/00; G06V 20/56
See application file for complete search history.

(56) References Cited

U.S. PATENT DOCUMENTS

2020/0160151 A1*  5/2020  Urtasun .............. G06V 20/56
2020/0160593 A1*  5/2020  Gu ...................... G06T 7/90

FOREIGN PATENT DOCUMENTS

| CN | 111145290 A | 5/2020 |
| EP | 3649579 A1 | 5/2020 |
| EP | 3782115 A1 | 2/2021 |

OTHER PUBLICATIONS

Jason Brownlee, A Gentle Introduction to Cycle GAN for Image Translation—Machine Learning Mastery, Aug. 17, 2019, Machine Learning Mastery, Generative Adversarial Networks, np (Year: 2019).*

(Continued)

*Primary Examiner* — Shefali D Goradia
*Assistant Examiner* — D J Dhooge
(74) *Attorney, Agent, or Firm* — Christopher G. Darrow; Darrow Mustafa PC (57) ABSTRACT

System, methods, and other embodiments described herein relate to training a model to stylize low-light images for improved perception. In one embodiment, a method includes encoding, by a style model, an input image to identify first content information. The method also includes decoding, by the style model, the first content information into an albedo component and a shading component. The method also includes generating, by the style model, a synthetic image using the albedo component and the shading component. The method also includes training the style model according to computed losses between the input image and the synthetic image.

20 Claims, 7 Drawing Sheets

(56) References Cited

OTHER PUBLICATIONS

Narihiri et al., "Direct Intrinsics: Learning Albedo-Shading Decomposition by Convolutional Regression," Proceedings of the IEEE International Conference on Computer Vision, 2015, pp. 2992-2992.

Huang et al., "Multimodal Unsupervised Image-to-Image Translation," Proceedings of the European Conference on Computer Vision, 2018, pp. 172-189.

Lettry et al., "Unsupervised Deep Single-Image Intrinsic Decomposition using Illumination-Varying Image Sequences," Computer Graphics Forum, vol. 37, Issue 7 Sep. 3, 2018, pp. 409-419.

Qiu et al., "Learning Inverse Rendering of Faces from Real-world Videos," eprint arXiv:2003.12047, Mar. 26, 2020, pp. 1-23.

Innamorati et al., "Plausible Shading Decomposition for Layered Photo Retouching," arXiv: 1701.06507v2, Feb. 2, 2017, 8 pages.

Sengupta et al., "SfSNet: Learning Shape, Reflectance and Illuminance of Faces in the wild," Proceedings of the IEEE Conference on Computer Vision and Pattern Recognition, 2018, pp. 6296-6305.

Matt Vitelli, "Intrinsic Image Decomposition Using Deep Convolution Networks," 2015, 4 pages.

Cheng et al., "Intrinsic Image Transformation via Scale Space Decomposition," Proceedings of the IEEE Conference on Computer Vision and Pattern Recognition, 2018, pp. 656-665.

Chen et al., "A Simple Model for Intrinsic Image Decomposition with Depth Cues," Proceedings of the IEEE International Conference on Computer Vision, 2013, pp. 241-248.

Baslamisli et al., "Joint Learning of Intrinsic Images and Semantic Segmentation," Proceedings of the European Conference on Computer Vision, 2018, pp. 286-302.

Lettry et al., "DARN: A Deep Adversarial Residual Network for Intrinsic Image Decomposition," 2018 IEEE Winter Conference on Applications of Computer Vision, 2018, pp. 1359-1367.

Ghofrani et al., "APS: A Large-Scale Multi-Modal Indoor Camera Positioning System," Pattern Recognition and Artificial Intelligence 4th Mediterranean Conference, 2021, pp. 1-16.

Mo et al., "InstaGAN: Instance-aware Image-to-Image Translation," ICLR 2019 Conference, 2019, pp. 1-26.

Bansal et al. "Recycle-GAN: Unsupervised Video Retargeting," Proceedings of the European Conference on Computer Vision (ECCV), 2018, pp. 119-135.

* cited by examiner

SYSTEMS AND METHODS FOR TRAINING A STYLE MODEL

TECHNICAL FIELD

The subject matter described herein relates, in general, to training a style model, and, more particularly, to training a style model for altering representations of low-light images to improve clarity.

BACKGROUND

A system may use images from a monocular camera to generate depth maps without relying on data from a light detection and ranging (LIDAR) sensor, thereby reducing complexity. For instance, a depth model can use information from the monocular camera to generate a depth map by estimating depths of objects within an image. In order to generate accurate depth maps, the system may alter images for certain environments. For example, image quality in low-light environments may be insufficient for depth estimation. As such, a system may be trained for different lighting conditions (e.g. low-light) using images. However, training the system according to encoding or decoding losses of an image may be complex due to difficulties of identifying features in low-light environments.

SUMMARY

In one embodiment, example systems and methods relate to training a style model to stylize low-light images for improved perception. In various implementations, a system may experience complexity and difficulties identifying features in low-light (e.g. nighttime) to a satisfactory level. For example, the complexity of vehicle applications may increase when combining image data from a monocular camera with LIDAR data to facilitate generating depth maps in low-light environments. Therefore, in one embodiment, a training system may compute losses to adjust a style model that stylizes real image content of a low-light environment and outputs synthetic images that improve perception. In one approach, the training system may train the style model using generator and predictor networks to accurately produce a daytime representation of the real image content. Here, the generator network may separate content and style (e.g. color and lighting) about objects within the real image and produce a synthetic representation (e.g. daytime or nighttime) for the content. As such, this approach may improve training by removing the complexity caused by different styles in low-light environments.

Furthermore, the training system may adapt networks according to losses. For example, the training system may compute a cyclic or scaling loss associated with daytime conversions performed by network models. For training the predictor network, the training system estimates an image using synthetic data. The predictor network may then estimate an image using the synthetic data according to prior images associated with loss computations.

Moreover, the training system next performs style conversion using fixed predictor parameters for synthetic conversion and predicts an image for style model adjustments. In this way, the training system may smoothen outputs through image association and reduce intermediate losses for the style conversion. Accordingly, the training system adjusts models associated with stylizing images in low-light using real image content for improving object perception.

In one embodiment, a training system for training a model to stylize low-light images for improved perception is disclosed. The training system includes a processor and a memory storing instructions. The instructions, when executed by the processor, may cause the processor to encode, by a style model, an input image to identify first content information. The instructions may also include instructions to decode, by the style model, the first content information into an albedo component and a shading component. The instructions may also include instructions to generate, by the style model, a synthetic image using the albedo component and the shading component. The instructions may also include instructions to train the style model according to computed losses between the input image and the synthetic image.

In one embodiment, a non-transitory computer-readable medium for training a model to stylize low-light images to improve perception and including instructions that when executed by a processor cause the processor to perform one or more functions is disclosed. The instructions include instructions to encode, by a style model, an input image to identify first content information. The instructions may also include instructions to decode, by the style model, the first content information into an albedo component and a shading component. The instructions may also include instructions to generate, by the style model, a synthetic image using the albedo component and the shading component. The instructions may also include instructions to train the style model according to computed losses between the input image and the synthetic image.

In one embodiment, a method for training a model to stylize low-light images for improved perception is disclosed. In one embodiment, the method includes encoding, by a style model, an input image to identify first content information. The method may also include decoding, by the style model, the first content information into an albedo component and a shading component. The method may also include generating, by the style model, a synthetic image using the albedo component and the shading component. The method may also include training the style model according to computed losses between the input image and the synthetic image.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with training a model to stylize low-light images for improved perception are disclosed herein. Tasks such as object detection may encounter difficulties in low-light environments due to muted color intensities and shadows reducing clarity. Accordingly, a training system may optimize a style model to stylize and enhance real image content for improving subsequent tasks. In one approach, the style model may be a generative adversarial network (GAN) that predicts color intensities within a low-light image for the synthetic domain. Furthermore, the style model may be adjusted for losses associated with decoding the image content into albedo and shading components to improve stylization. An albedo decoder may identify intrinsic colors of objects without information regarding light projection about the image content. On the other hand, the shading decoder may identify shadows and lighting conditions about the image content. In this way, the training system adjusts the style model to enhance intrinsic colors of the low-light image while also processing shading features thereby improving perception.

Furthermore, in various implementations, the style model may convert low-light image content to a synthetic image for reducing complexity. For synthetic processing, the training system may minimize reconstruction losses associated with predictors and generators converting the low-light image content to the synthetic domain. A reconstruction loss may be associated with errors between the original data and the lower dimensional reconstruction. Regarding predictors, a predictor network may estimate an image using synthetic data according to prior images. Conversely, a generator may convert an image from one domain or state to another.

Moreover, for computing the reconstruction losses the training system inputs encoded representations to nighttime and synthetic decoders of the style model. For example, the training system may compare the differences of the image content and style representations in the latent space to predicted versions. In one approach, the training system may compare content and style values about real nighttime and synthetic images after processing by the style model. Similarly, the training system may compare the albedo and shading components about a synthetic image to subsequent processing for adjusting decoders.

In various implementations, the training system may also use a predictor network to improve training of the style model. As such, the training system may adjust the predictor network by estimating an image using synthetic data. The predictor network may then estimate an image by comparing the synthetic data to prior images. For the style model training, the training system performs style conversion using fixed predictor parameters for the stylization and predicts an image. To complete training, the training system may convert the predicted image to a nighttime representation that is compared to a ground truth. Model parameters of the style model are then adjusted accordingly. In this way, the training system may smoothen outputs through image association, reduce intermediate losses, and reduce decoding losses for the style conversion. Accordingly, the training system adjusts models to particularly stylize images in low-light environments converted from the real to synthetic domains thereby improving object perception.

Figure 1:
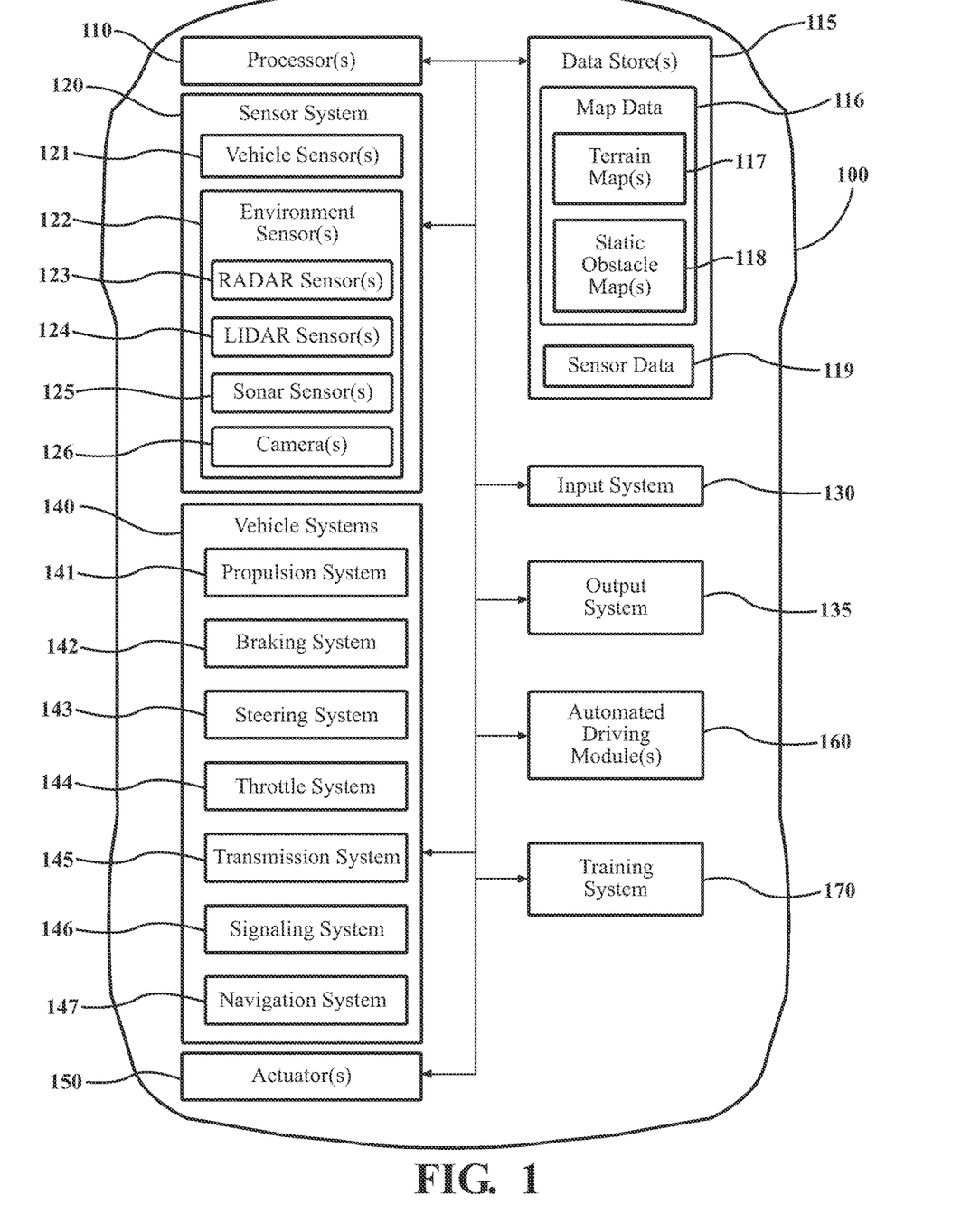
FIG. 1 illustrates one embodiment of a vehicle within which systems and methods disclosed herein may be implemented.

Referring to FIG. 1, an example of a vehicle 100 is illustrated. In one or more implementations, the vehicle 100 is an automobile. While arrangements will be described herein with respect to automobiles, it will be understood that embodiments are not limited to automobiles. In some implementations, the training system 170 may be used for consumer electronics, mobile devices, robotic devices, drones, and so on. In some implementations, the vehicle 100 may be any robotic device or form of motorized transport that, for example, includes sensors to perceive aspects of the surrounding environment, and thus benefits from the functionality discussed herein associated with training a style model to stylize image content for improving object perception.

In any case, the vehicle 100, as described herein, also includes various elements. It will be understood that, in various embodiments, it may not be necessary for the vehicle 100 to have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are illustrated as being located within the vehicle 100, it will be understood that one or more of these elements can be located external to the vehicle 100. Further, the elements shown may be physically separated by large distances. For example, as discussed, one or more components of the disclosed system can be implemented within a vehicle while further components of the system are implemented remote from the vehicle 100.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a training system 170 that is implemented to perform methods and other functions as disclosed herein relating to training a style model to stylize image content for improving object perception. As will be discussed in greater detail subsequently, the training system 170, in various embodiments, is implemented partially within the vehicle 100, and as a cloud-based service.

Figure 2:
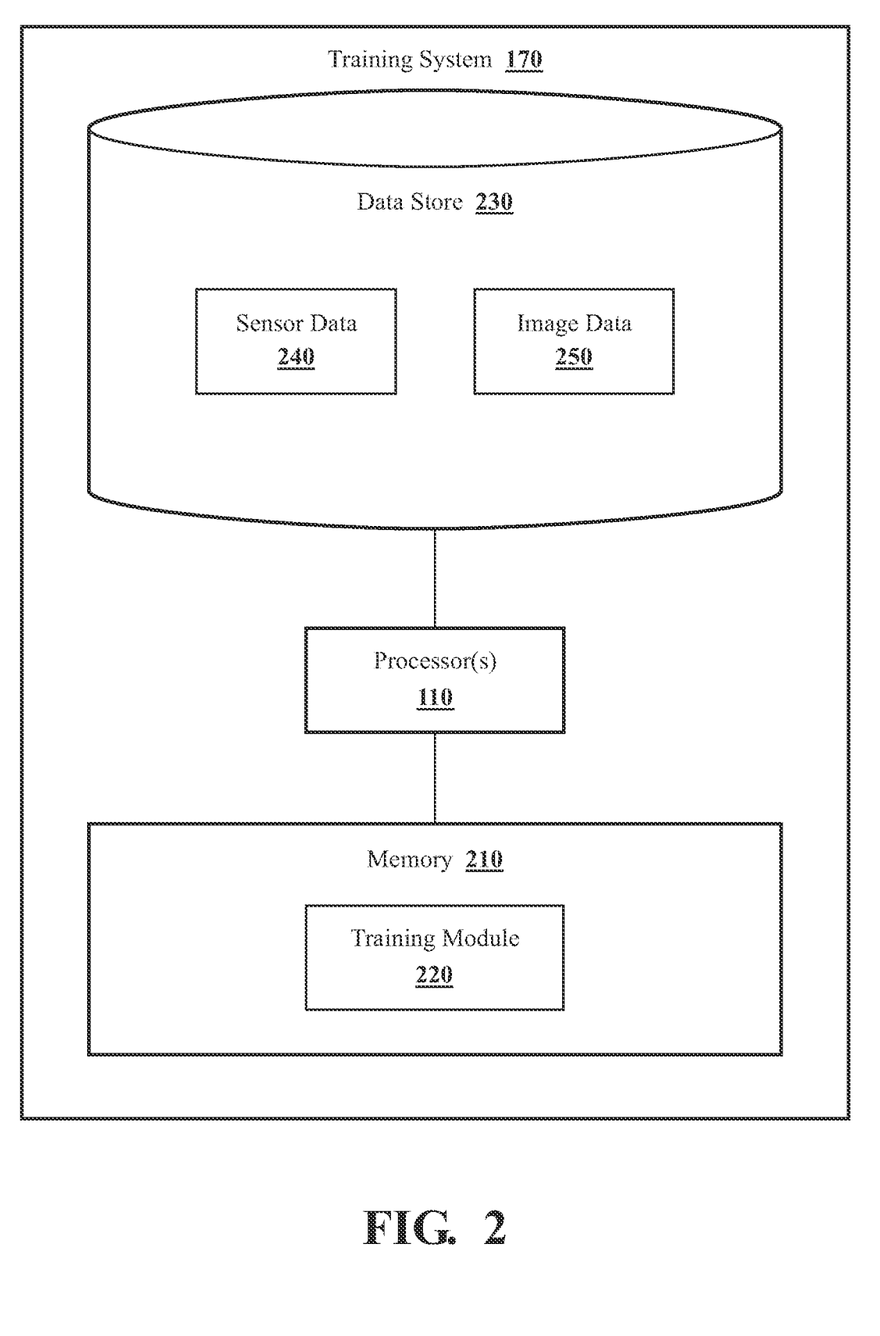
FIG. 2 illustrates one embodiment of a training system that trains a style model for improved perception of objects within low-light images.

With reference to FIG. 2, one embodiment of the training system 170 of FIG. 1 is further illustrated. The training system 170 is shown as including a processor(s) 110 from the vehicle 100 of FIG. 1. Accordingly, the processor(s) 110 may be a part of the training system 170, the training system 170 may include a separate processor from the processor(s) 110 of the vehicle 100, or the training system 170 may access the processor(s) 110 through a data bus or another communication path. In one embodiment, the training system 170 includes a memory 210 that stores a training module 220. The memory 210 is a random-access memory (RAM), read-only memory (ROM), a hard-disk drive, a flash memory, or other suitable memory for storing the training module 220. The training module 220 is, for example, computer-readable instructions that, when executed by the processor(s) 110, cause the processor(s) 110 to perform the various functions disclosed herein.

The training system 170 as illustrated in FIG. 2 is generally an abstracted form of the training system 170 having the training module 220. As such, the training module 220 generally includes instructions that function to control the processor(s) 110 to receive data inputs from one or more sensors of the vehicle 100. The inputs are, in one embodiment, observations of one or more objects in an environment proximate to the vehicle 100 and/or other aspects about the surroundings. As provided for herein, the training module 220, in one embodiment, acquires sensor data 240 that includes at least camera images. For example, the images may be taken by a monocular camera for object perception through stylization.

Accordingly, the training module 220, in one embodiment, controls the respective sensors to provide the data inputs in the form of the sensor data 240. Moreover, in one embodiment, the training system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the training module 220 in executing various functions. For example, the data store 230 includes the image data 250. As explained below, the image data may include real images, synthetic images, nighttime images, daytime images, and so on to train a style model for improved perception through stylization.

Moreover, the training module 220, in one embodiment, is further configured to perform additional tasks beyond controlling the respective sensors to acquire and provide the sensor data 240. For example, the training module 220 includes instructions that cause the processor 110 to process a real image (e.g. a nighttime image) for training a style model. For stylization, in various implementations, the style model may be a GAN that decomposes low-light image content (e.g. real nighttime images) into components that improve perception. In particular, the style model may convert real images of low-light environments (e.g. nighttime) by performing albedo and shading decoding using image content with styles removed. In this regard, content may identify objects in the real image such as vehicles, pedestrians, buildings, and so on. Style may identify object features, such as colors and lighting conditions. In this way, the style model is trained to produce stylized images optimized for perceiving objects in low-light environments by removing style complexity.

Regarding training for low-light conditions, low-light may represent lighting environments where systems using a monocular camera, a RGB camera(s), an optical camera(s), machine vision, and so on have difficulties perceiving objects due to muted color intensities. For instance, operating the vehicle 100 during nighttime in the dark, indoors, at twilight, and so on may be environments having low-light. Increased light may represent brighter lighting conditions where systems using a monocular camera, a RGB camera(s), an optical camera(s), machine vision, and so on may reliably perceive objects within images from the color intensities. For example, operating the vehicle 100 during daytime in the daylight, outdoors, in the morning, and so on may be environments having increased light. Of course, reference to daytime versus nighttime to define lighting levels can generally be subjective due to variations in weather and other factors influencing lighting. As such, lux (lx) may be used to represent lighting levels as a unit of luminance per square meter for definitiveness. Accordingly, daytime, increased light, brighter lighting, and so on generally refer to conditions in which the ambient light may have sufficient lumens (e.g. 30 k lx to 100 k lx) for perceiving objects. On the contrary, nighttime, low-light, indoors, and so on generally refer to conditions in which the ambient light may have insufficient lumens (e.g. 1 lx to 60 lx) for perceiving objects.

Figure 3A:
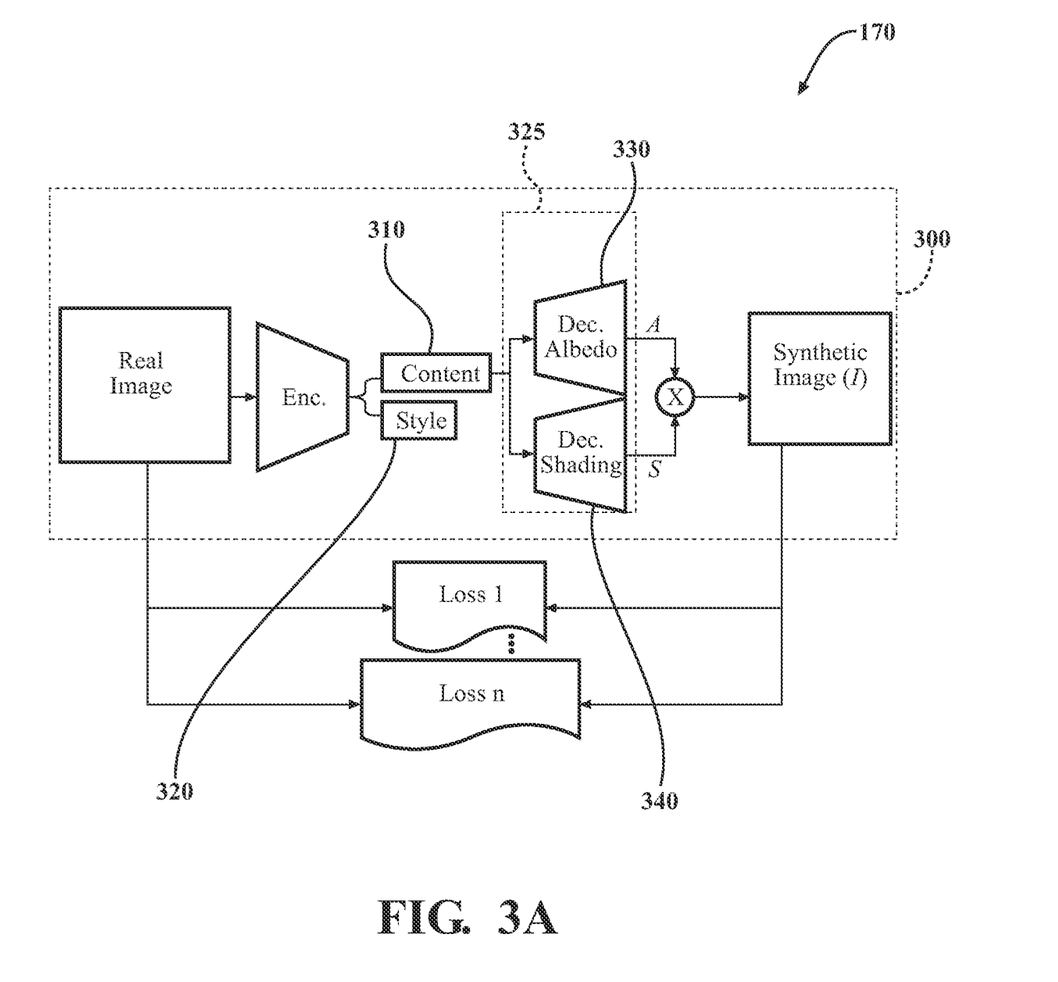
FIG. 3A illustrates one embodiment of the training system adapting a style model for improved perception of image content.

Regarding the training architecture, FIG. 3A illustrates one embodiment of the training system 170 adjusting a style model 300 for improving the perception of image content. As explained below, the style model 300 may incur losses from converting real images to synthetic images. For example, the conversion to a daytime representation from nighttime may incur sequential and scaling losses. As such, the training system 170 may adapt parameters of the style model 300 until losses are minimized or the model is optimized.

In one approach, the training system 170 may perform style conversion as follows for training. The style model 300 may represent a GAN or neural network that predicts color intensities for object perception within a low-light image. For instance, a GAN may include a pair of neural networks that compete in a zero-sum game for learning. The GAN output may be new data with similar statistics as training data. Here, the training system 170 may adapt the GAN to generate a synthetic image(s) from a nighttime image that optimizes object appearance by colors, shadows, shading, lighting conditions, and so on. As such, in one approach the style model 300 may perform style or domain transfer by converting real nighttime image(s) to synthetic daytime image(s). The daytime representation may have the same content as the real image(s) while changing lighting or styles to increase richness for perception. In various implementations, the style model 300 may also be a cyclic GAN (cGAN) that performs predictions according to the real image input being the condition. In this way, the cGAN may regulate noise while generating synthetic representations substantially similar in content to real image inputs.

Now the style processing details will be explained prior to the training details. The style model 300 may separate a real image into content information 310 and style information 320 through encoding. Content may identify objects in the real image such as vehicles, pedestrians, buildings, and so on. Style may identify object features, such as colors, shadows, lighting conditions, and so on. In this way, the style model 300 may reduce complexity and improve perception by removing style complexities from the real images in low-light conditions. Furthermore, removing color, shadows, and lighting conditions may also reduce noise for processing the real images in low-light environments.

After encoding, the decoder 325 separately decodes the content information 310 for the style conversion. In particular, the albedo decoder 330 and the shading decoder 340 produce the synthetic image I as I=A·S that is stylized for improved perception. The albedo decoder 330 may identify intrinsic colors of objects without information regarding light projection about the content information 310. On the other hand, the shading decoder 340 may involve identifying shadows, reflections, and lighting conditions about the content information 310. Accordingly, the albedo component A may be a matrix with magnitudes for colors in the real image without information regarding light projection about the content information 310. Whilst, the shading component S may be a matrix with magnitudes representing shadows, reflections, and lighting conditions about the content information 310. Put another way, the albedo component may represent an intrinsic color layer that the style model 300 derives whereas the shading component is a processed representation of the image highlighting certain features.

Figure 4:
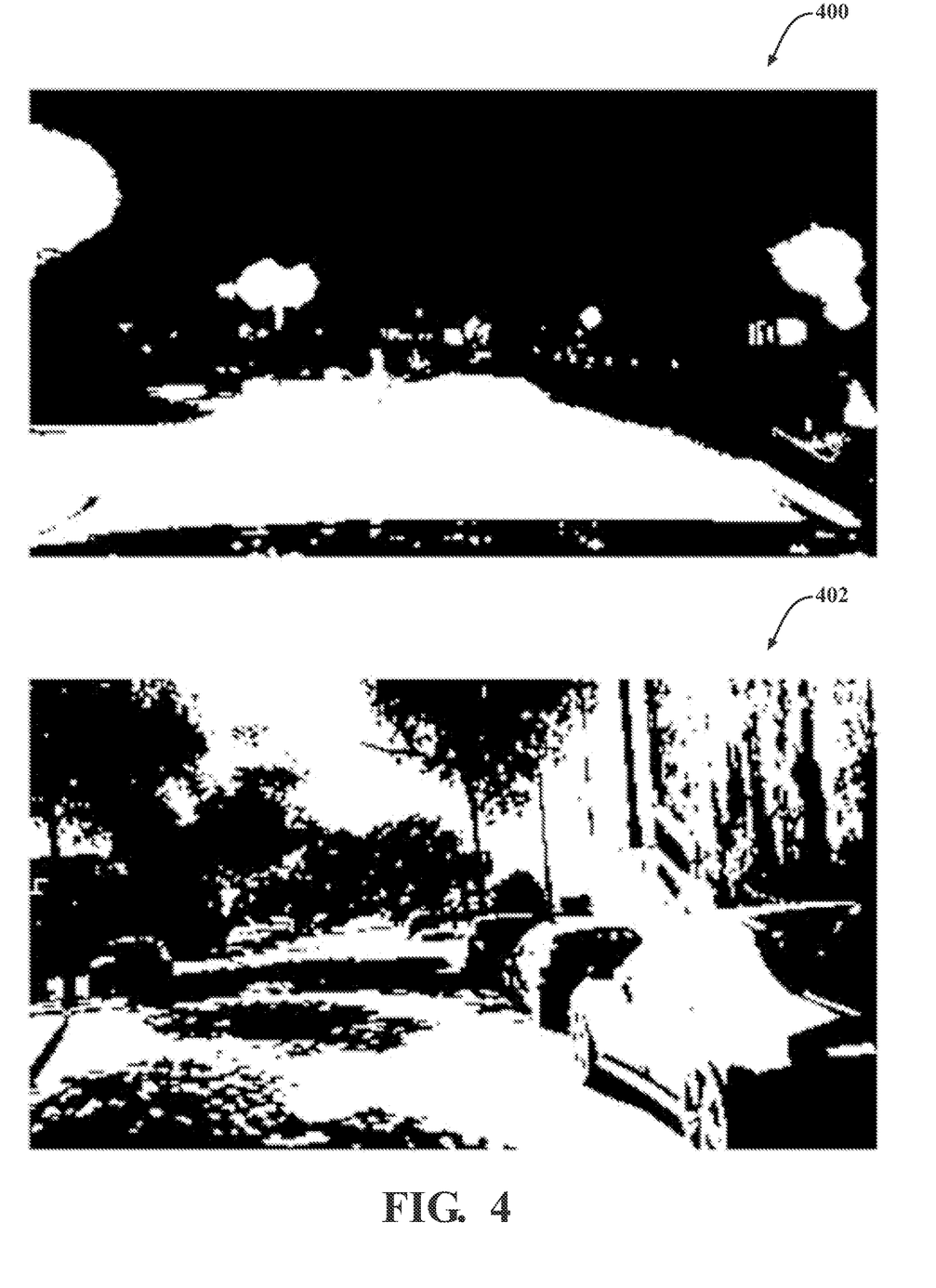
FIG. 4 illustrates examples of the style model converting a real nighttime image to a daytime image for perception applications.

Moreover, multiplying A·S may produce a synthetic image I in the form of a matrix representing information about the content information 310 that is stylized for improved object perception. In particular, the synthetic image I may have rich color information accounting for shadows or reflections with improved radiance, particularly for low-light conditions. In this way, the style model 300 may optimize a low-light image for perception by distinguishing object features in a radiant representation (e.g. daytime) using an albedo decoder decoupled from shading as illustrated in FIG. 4. As shown, the real nighttime image 400 has muted color intensities and complex shadows. However, a decoded daytime representation 402 in the synthetic domain has highlighted features more adept for object perception. Thus, the albedo decoder may highlight intrinsic colors of objects with less interference for low-light shading.

Regarding the training details, the training system 170 computes Loss 1 to Loss n between the real input image and the synthetic image I to adjust the style model 300. For example, the training system 170 may compute any one of a scale-invariant feature transform (SIFT) loss $L_{SIFT}$, a sequential consistency loss $L_{Seq}$, a reconstruction loss $L_{Recon}$, a GAN loss $L_{GAN}$, and a cyclic loss $L_{Cycle}$ according to perception applications. Examples of applications may include low-light conditions, inclement weather, navigation, depth estimation, and so on. As such, the training system 170 may use the losses to regularize stylization and minimize the difference between estimated image sequences. In this way, the training system 170 may refine the prediction of the albedo decoder 330 and the shading decoder 340 to enhance intrinsic colors outputted by the style model 300.

In various implementations, the training system 170 may compute the following total loss for training generators (e.g. albedo or shading decoder) and other components:

$$L_{total}=a_0 L_{SIFT}+a_1 L_{Seq}+a_2 L_{Recon}+a_3 L_{GAN}+a_4 L_{cycle}. \quad \text{Equation (1)}$$

Here, variables $a_0$-$a_4$ in Equation (1) may be hyperparameters used to train the style model 300. The loss computations by the training system 170 may use the notions defined in Table 1.

TABLE 1

X: Nighttime image (e.g. real nighttime image)
Y: Synthetic image
$C_N$, $C_S$: Content of images in the latent space (nighttime and synthetic respectively)
$S_N$, $S_S$: Style of images in the latent space (nighttime and synthetic respectively)
$X_R$: Reconstructed image (from nighttime to synthetic domain, then back to nighttime domain)
$X_S$: Stylized nighttime image (content from the nighttime image with a style from synthetic domain)
$Y_A$, $Y_S$: Albedo and shading components of a synthetic image
$E_N^C$: Content output of the nighttime domain encoder
$E_N^S$: Style output of the nighttime domain encoder
$X^i$, $Y^i$: Superscript i represents X and Y at a specific time i
SI: SIFT operator TABLE 1-continued $P_1$: $1^{st}$ Predictor Network (trained using the sequence of nighttime images) Given $x^i$ and $x^{i+1}$ the network predicts $x^{i+2}$
$P_2$: $2^{nd}$ Predictor Network (trained using the sequence of synthetic images) Given $y^i$ and $y^{i+1}$ the network predicts $y^{i+2}$ Regarding $L_{SIFT}$, the training system 170 may minimize the SIFT loss such that content information 310 is preserved when splitting the latent space into content and style. In other words, a SIFT loss may represent losses associated with predicting local features of an image. As such, the training system 170 may compute $L_{SIFT}$ as follows:

$$L_{SIFT}=\|SI(X^i)-SI(X_R^i)\|_1+\|SI(Y^i)-SI(Y_R^i)\|_1. \quad \text{Equation (2)}$$

In Equation (2), the SIFT loss is the difference between nighttime or synthetic images and corresponding reconstructions inputted to SIFT operators for time i. In this regard, in one approach a reconstruction may represent an image converted from the nighttime domain (e.g. real domain) to synthetic daytime domain then back to the nighttime domain. Accordingly, reducing this loss may ensure that the style model 300 preserves image content during conversion. Besides SIFT losses, the training system 170 may also use other similar functions to evaluate losses associated with maintaining content when splitting the latent space into content and style.

As referenced above, the training system 170 may also minimize losses from sequential flow to refine outputs from the albedo decoder 330 and the shading decoder 340. Accordingly, a sequential consistency loss may be associated with the distance between the two prediction distributions. For example, the $L_{Seq}$ may be computed as follows:

$$L_{Seq}=\|Y_S^{i+2}-P_1(Y_S^i,Y_S^{i+1})\|_2+\|X_S^{i+2}-P_2(X_S^i,X_S^{i+1})\|_2. \quad \text{Equation (3)}$$

Here, the training system 170 uses Equation (3) to minimize losses between current and predicted images. In particular, predicted synthetic and nighttime shading components at time i+2 are compared to corresponding images at time i and i+1. In this way, the training system may maintain shading information during the conversion to daytime representations from sequential nighttime images thereby improving subsequent perception tasks.

Figure 3B:
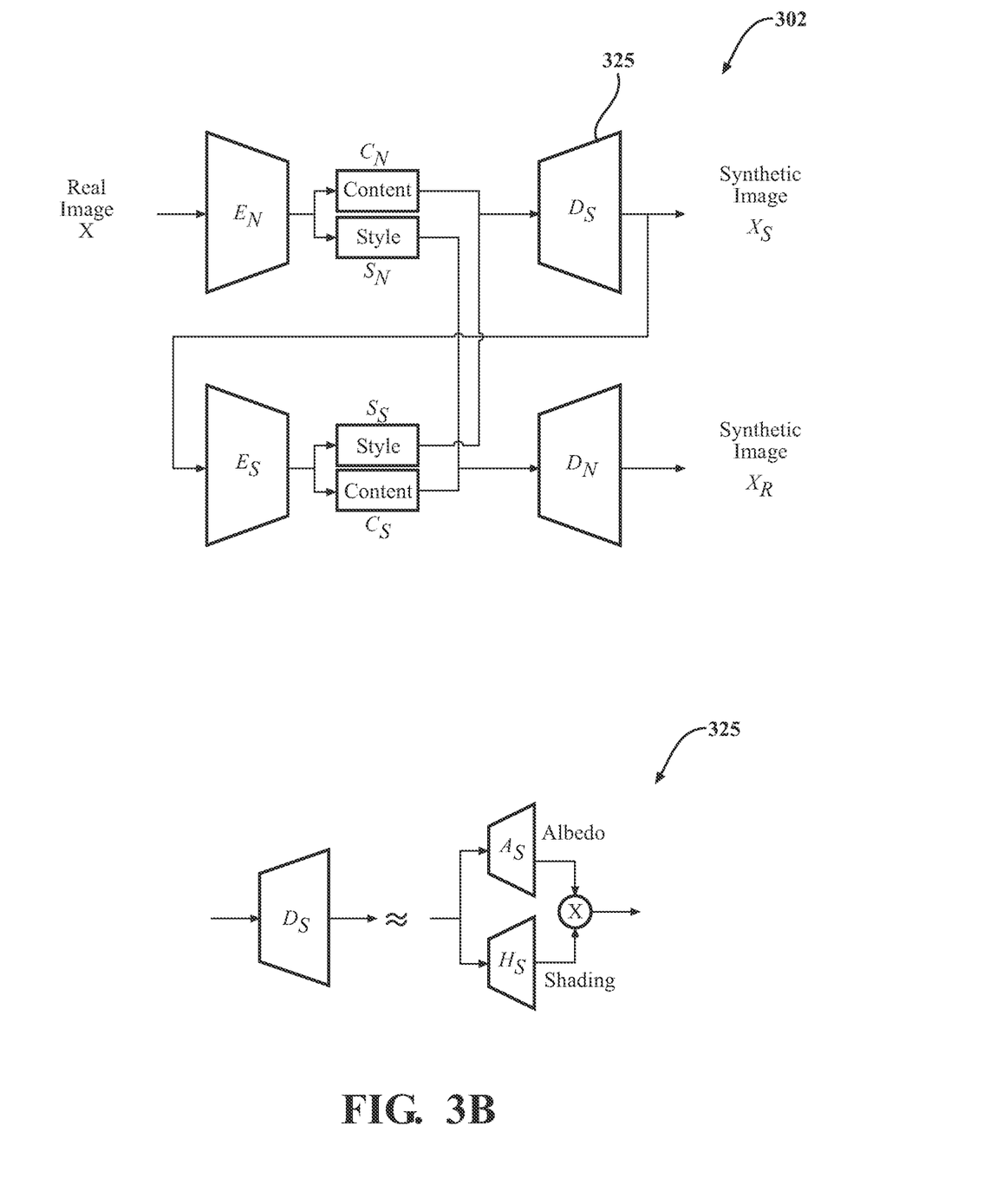
FIG. 3B illustrates a cyclic network used to compute losses of the style model during training.

To further reduce losses, the training system 170 may train the style model 300 to decrease reconstruction and cyclic losses. In particular, FIG. 3B illustrates a cyclic network 302 used to compute losses of the style model 300 during training. To reduce the cyclic loss, the training system 170 may compute the following:

$$L_{cycle}=\|X^i-X_R^i\|_2+\|Y^i-Y_R^i\|_2. \quad \text{Equation (4)}$$

Here, a nighttime image at time i is compared to a reconstructed nighttime image. Similarly, a synthetic image at time i is compared to a reconstructed synthetic image. In this way, the training system 170 may adjust the style model by accounting for losses from the decoder 325 manipulating or processing the image content.

In one approach, the cyclic network 302 may determine the stylized nighttime image $X_S$ using the $D_s$ decoder 325 on the nighttime content $C_N$ from a latent space. To account for cyclic losses, the cyclic network 302 also uses the synthetic style, in the latent space, $S_S$ from encoding by Es a prior representation of Xs for the decoding. Similarly, the cyclic network 302 may determine the reconstructed image $X_R$ by decoding the synthetic content $C_S$ using the decoder 325. Here, Cs is the $E_S$ encoded content of the stylized nighttime image $X_S$ in the latent space. However, the cyclic network 302 uses the nighttime style, in the latent space, $S_N$ for the decoding. In this way, the training system 170 may further minimize losses from the decoder 325 by adjusting the style model 300 using cyclic losses.

In one approach, the training system 170 may compute the reconstruction loss using Equation (5) as follows:

$$L_{Recon} = \|X^i - D_N(E_N(X^i))\|_2 + \|Y^i - D_S(E_S(Y^i))\|_2 + \|C_N - E_S^C(D_S(C_N, S_S))\|_2 + \|C_S - E_N^C(D_N(C_S, S_N))\|_2 + \|Y_A^i - A_S(E_S(Y^i))\|_2 + \|Y_S^i + H_S(E_S(Y^i))\|_2.$$

Equation (5)

A reconstruction loss may be associated with the error between the original data and lower dimensional reconstructions. As illustrated in FIG. 3B, nighttime and synthetic images (e.g. nighttime or daytime) may be compared to corresponding encoded representations at time i. The encoded representations are inputted to nighttime and synthetic decoders to determine reconstruction losses of the style model 300. In addition, the training system 170 may compare the differences of image content and style in the latent space of the style model 300 to predicted versions. For example, content and style values about nighttime and synthetic images (e.g. nighttime or daytime) may be compared after processing by the style model 300. Similarly, the training system 170 may compare the albedo and shading components about a synthetic image to subsequent processing by the style model 300. In this way, the training system 170 may adjust the style model 300 according to losses from encoding and decoding images.

Figure 3C:
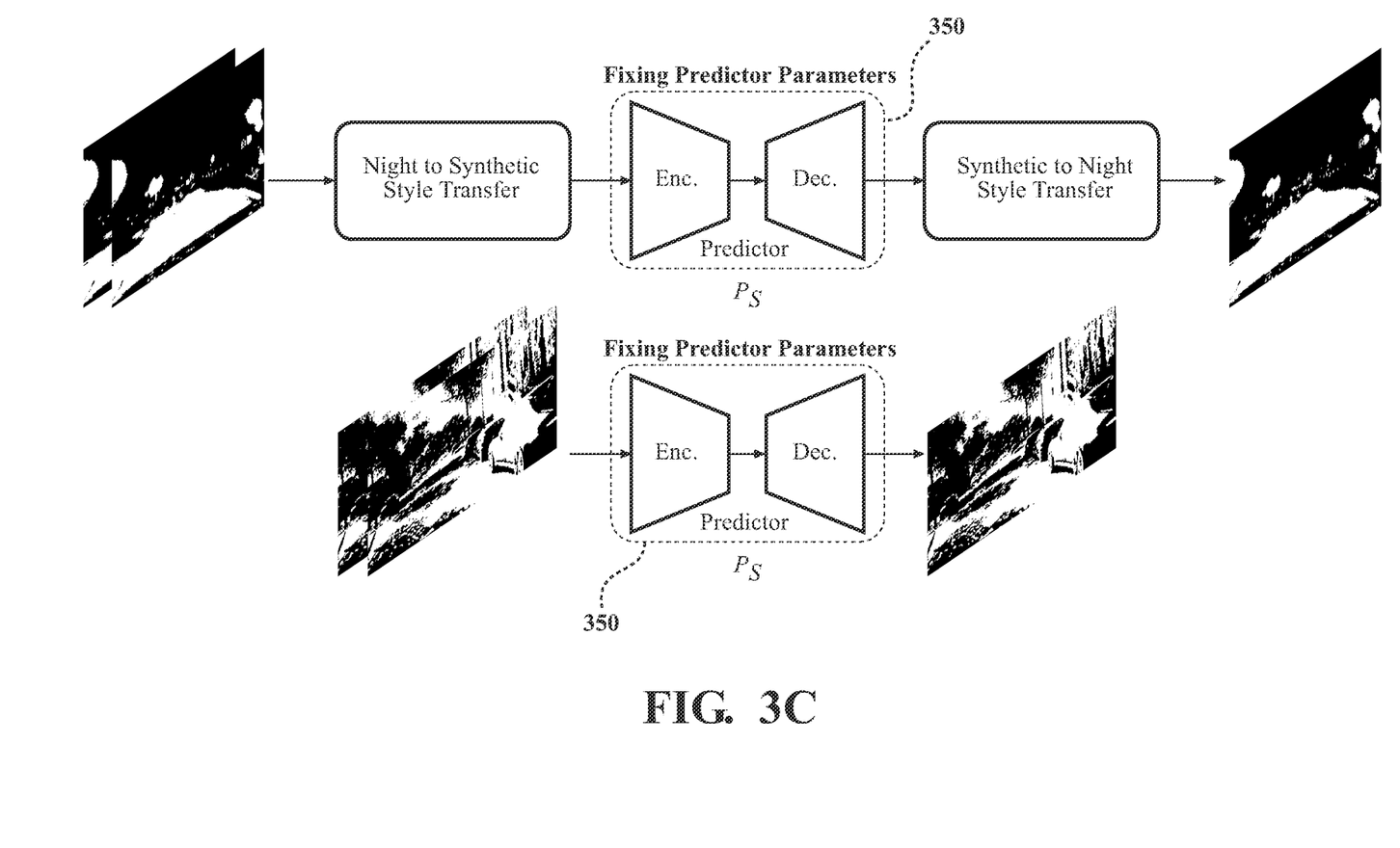
FIG. 3C illustrates a prediction network used with the style model for training.

In addition to reconstruction losses, in various implementations, the training system 170 may train a prediction network to improve adjustments of the style model 300. For example, the prediction network may reduce intermediate losses by the style model 300. Accordingly, FIG. 3C illustrates a prediction network used with the style model 300 for training. As such, the training system 170 may compute the following loss:

$$L_P = \|X^{i+2} - P_1(X^i, X^{i+1})\|_2 + \|Y^{i+2} - P_2(Y^i, Y^{i+1})\|_2.$$

Equation (6)

Here, the training system 170 may use Equation (6) to minimize losses between current and predicted images. In Equation (6), the predictor networks may use the most recent n frames to predict the next frame in the night and synthetic domains, respectively. For example, $P_1$ may be a predictor network trained using a sequence of nighttime images. This network predicts $X^{i+2}$ given $X^i$ and $X^{i+1}$. Similarly, $P_2$ may be a predictor network trained using synthetic images where given $Y^i$ and $Y^{i+1}$ the network predicts $Y^{i+2}$. The actual values of predicts $X^{i+2}$ and $Y^{i+2}$ are compared to predicted values for subsequently minimizing the prediction loss $L_P$.

In one approach, the training system 170 may use the predictor network 350 to improve training of the style model 300. As such, the training system 170 may estimate an image using synthetic data. The predictor network 350 may then estimate an image using the synthetic data at time t according to prior images. Next, the training system 170 performs style conversion using predictor parameters that are fixed for synthetic conversion and predicts the following image. For adjusting parameters, the training system 170 may convert the predicted image to a nighttime representation that is compared to a ground truth. In this way, the training system 170 may smoothen outputs through image association and reduce intermediate losses associated with the style model 300 by using the predictor network 350.

Regarding other losses associated with training the style model 300, the training system 170 may compute a discriminator loss. This may represent losses between real and synthetic data generated by the style model 300 when the network is arranged as a GAN. For example, the discriminator loss may be:

$$L_D = -L_{GAN}.$$

Equation (7)

Here, $L_{GAN}$ may be the GAN loss of the style model 300. The training system 170 may determine the GAN loss using:

$$D_S(\xi) = A_S(\xi) \times H_S(\xi).$$

Equation (8)

In Equation (8), $A_S$ and $H_S$ are the albedo and shading generators of the decoder 325 used to determine the synthetic image $D_S$. As such, the training system 170 may reduce the GAN or discrimination loss by comparing $D_S$ to unprocessed representations. In this way, the training system 170 may reduce losses associated with generating synthetic elements of a real nighttime image.

Figure 5:
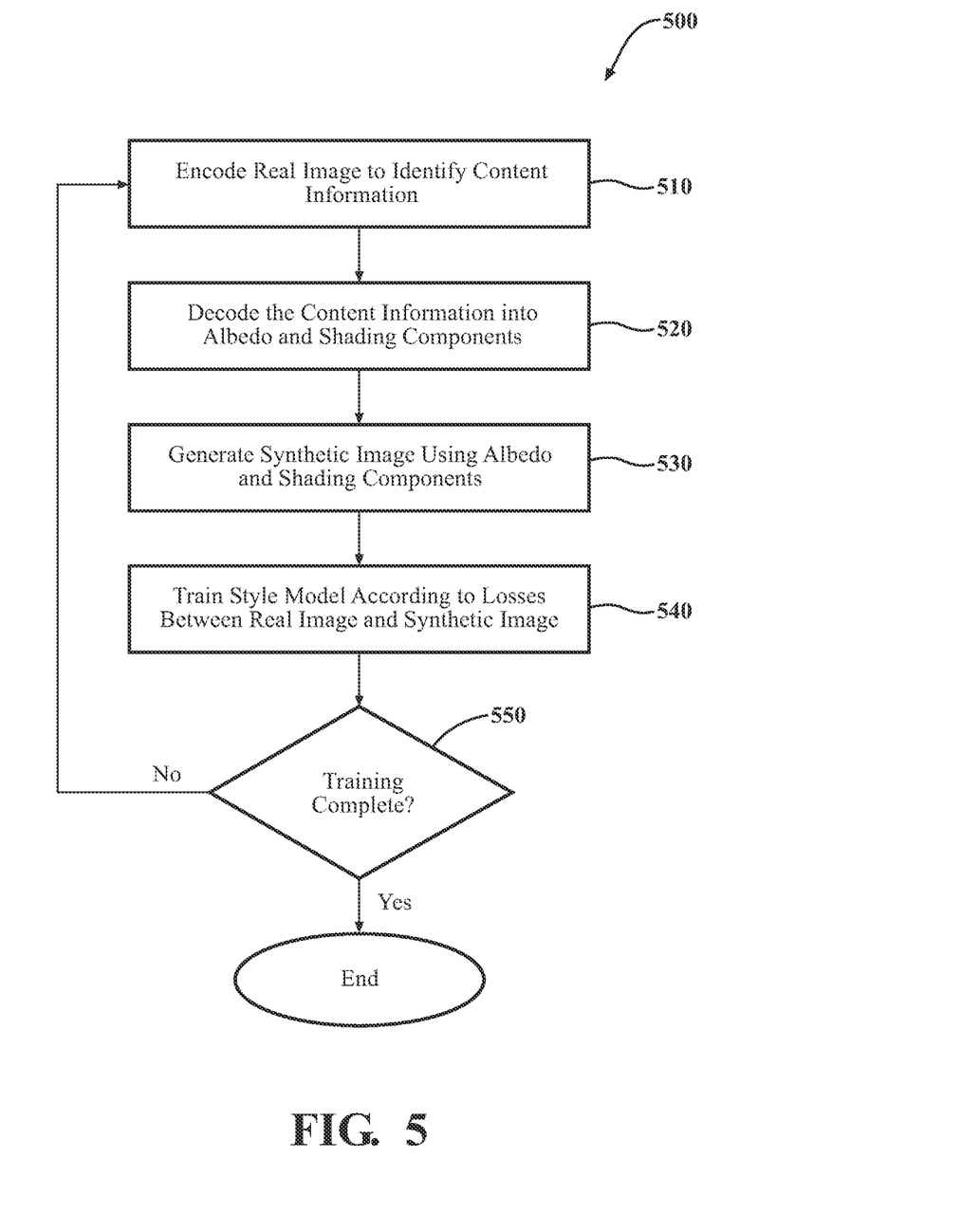
FIG. 5 illustrates one embodiment of a method that is associated with training a style model for improved perception of image content.

Turning now to FIG. 5, a flowchart of a method 500 that is associated with training a style model for improving the perception of image content is illustrated. Method 500 will be discussed from the perspective of the training system 170 of FIGS. 1, and 2. While method 500 is discussed in combination with the training system 170, it should be appreciated that the method 500 is not limited to being implemented within the training system 170 but is instead one example of a system that may implement the method 500.

At 510, the style model 300 encodes a real image to identify content information. For example, the style model 300 may be a GAN that predicts color intensities for object perception within a low-light image. As such, the style model 300 may separate a real image into content and style information by encoding. Content may identify objects in the real image such as vehicles, pedestrians, buildings, and so on. Style may identify object features, such as colors, shadows, lighting conditions, and so on. In this way, the style model 300 may improve operation by removing style variances from the real image and correspondingly reduce noise in low-light environments.

For further style operations, at 520 the style model 300 decodes the content information into albedo and processed shading components. As explained above, the style model 300 may separately decode the content information using albedo and shading decoders for style conversion. In this way, an albedo decoder may identify intrinsic colors of objects without information regarding light projection about the content information. On the other hand, a shading decoder may involve identifying shadows, reflections, and lighting conditions about the content information. In other words, the albedo component may represent an intrinsic color layer that the style model 300 derives whereas the shading component is a processed representation of the image highlighting certain features. In various implementations, the style model 300 may also process the real content information using the albedo decoder prior to the shading decoder to optimize enhancement of the intrinsic colors.

The output of the style model 300 may be a stylized synthetic image. At 530, the style model uses the decoded albedo and processed shading components of the image content to generate the synthetic image stylized for improving depth perception. For example, the style model 300 may perform matrix multiplication of A·S and produce a synthetic image I. The synthetic image I may have rich color information that accounts for shadows or reflections with improved radiance, particularly for low-light conditions, for the image content. In this way, the style model 300 may optimize a low-light image for perception by distinguishing object features in a radiant representation (e.g. daytime) using an albedo decoder decoupled from shading.

For training the style model 300, the training system 170 uses the computed losses between an inputted real image and the synthetic image I. As explained above, the training system 170 may compute a total loss of the style model using any one of $L_{SIFT}$, $L_{Seq}$, $L_{Recon}$, $L_{GAN}$, and $L_{Cycle}$. In one approach, different losses may be used to adjust the style model 300 according to perception applications. Examples of applications may include low-light conditions, inclement weather, navigation, depth estimation, and so on. In this way, the training system 170 may use the losses to regularize stylization and minimize distortion from sequential images. As such, the training system 170 may refine the prediction of the decoder 325 to enhance intrinsic colors of outputs from the style model 300 thereby improving perception, particularly in low-light environments.

At 550, the training system 170 may continue adapting or adjusting parameters of the style model 300 until certain losses are minimized. For example, minimization continues until weights of the style model 300 converge or losses fall below a threshold. In this way, the style model 300 and particularly the decoder 325 are optimized to stylize images taken in low-light environments to improve subsequent tasks (e.g. depth perception).

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, Programmable Read-Only Memory (PROM), Erasable Programmable Read-Only Memory (EPROM), Electrically Erasable Programmable Read-Only Memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the training system 170, and/or the automated or autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement of the vehicle 100. The processor(s) 110, the training system 170, and/or the autonomous driving module(s) 160 may control some or all of the vehicle systems 140 and, thus, may be partially or fully autonomous as defined by the society of automotive engineers (SAE) levels 0 to 5.

The processor(s) 110, the training system 170, and/or the autonomous driving module(s) 160 may be operable to control the navigation and maneuvering of the vehicle 100 by controlling one or more of the vehicle systems 140 and/or components thereof. For instance, when operating in an autonomous mode, the processor(s) 110, the training system 170, and/or the autonomous driving module(s) 160 can control the direction and/or speed of the vehicle 100. The processor(s) 110, the training system 170, and/or the autonomous driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the autonomous driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the training system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 240. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or Flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A training system for improving object perception comprising:
a processor; and
a memory storing instructions that, when executed by the processor, cause the processor to:
encode, by a style model that processes data, an input image to identify first content information and identify style information, wherein the first content information is separated from the style information that identifies style features about objects within the input image;
decode, by the style model separate from the style features, the first content information into an albedo component and a shading component;
generate, by the style model, a synthetic image using the albedo component and the shading component; and
train the style model according to computed losses between the input image and the synthetic image, the computed losses including a synthetic loss from synthetic style generated with the synthetic image.

2. The training system of claim 1, further including instructions to generate a synthetic representation using the first content information and the synthetic style encoded from the synthetic image within a latent space and compute a cyclic loss as part of the computed losses using the synthetic representation.

3. The training system of claim 1, further including instructions to generate a synthetic representation using the style information of the input image and second content information that is synthetic and encoded from the synthetic image within a latent space and compute a cyclic loss as part of the computed losses using the synthetic representation.

4. The training system of claim 3, wherein the instructions to generate the synthetic representation further include instructions to use albedo decoding and shading decoding.

5. The training system of claim 1, further including instructions to decode the first content information into the albedo component by a first decoder and decode the first content information into the shading component by a second decoder.

6. The training system of claim 1, wherein the computed losses include any one of a scale-invariant feature transform (SIFT) loss, a sequential consistency loss, a reconstruction loss, a generative adversarial network (GAN) loss, and a cyclic loss.

7. The training system of claim 1, further including instructions to:
predict, by a predictor network, an estimated image using the synthetic image;
adjust parameters of the predictor network according to a prediction loss associated with the estimated image; and
provide the estimated image to the style model for identifying second content information, wherein the second content information is associated with the first content information.

8. The training system of claim 1, wherein the instructions to generate the synthetic image further include instructions to multiply values of the albedo component and the shading component and the synthetic image is stylized without the style information and the synthetic style to perceive the objects within the input image.

9. The training system of claim 1, wherein the input image is a nighttime image and the synthetic image is a daytime representation of the nighttime image.

10. A non-transitory computer-readable medium for improving object perception comprising:
instructions that when executed by a processor cause the processor to:
encode, by a style model, an input image to identify first content information and identify style information, wherein the first content information is separated from the style information that identifies style features about objects within the input image;

decode, by the style model separate from the style features, the first content information into an albedo component and a shading component;

generate, by the style model, a synthetic image using the albedo component and the shading component; and train the style model according to computed losses between the input image and the synthetic image, the computed losses including a synthetic loss from synthetic style generated with the synthetic image.

11. The non-transitory computer-readable medium of claim 10, further including instructions to generate a synthetic representation using the first content information and the synthetic style encoded from the synthetic image within a latent space and compute a cyclic loss as part of the computed losses using the synthetic representation.

12. The non-transitory computer-readable medium of claim 10, further including instructions to generate a synthetic representation using the style information of the input image and second content information that is synthetic and encoded from the synthetic image within a latent space and compute a cyclic loss as part of the computed losses using the synthetic representation.

13. A method comprising:

encoding, by a style model, an input image to identify first content information and identify style information, wherein the first content information is separated from the style information that identifies style features about objects within the input image;

decoding, by the style model separate from the style features, the first content information into an albedo component and a shading component;

generating, by the style model, a synthetic image using the albedo component and the shading component; and training the style model according to computed losses between the input image and the synthetic image, the computed losses including a synthetic loss from synthetic style generated with the synthetic image.

14. The method of claim 13, further comprising:

generating a synthetic representation using the first content information and the synthetic style encoded from the synthetic image within a latent space; and computing a cyclic loss as part of the computed losses using the synthetic representation.

15. The method of claim 13, further comprising:

generating a synthetic representation using the style information of the input image and second content information that is synthetic and encoded from the synthetic image within a latent space; and computing a cyclic loss as part of the computed losses using the synthetic representation.

16. The method of claim 15, wherein generating the synthetic representation further includes using albedo decoding and shading decoding.

17. The method of claim 13, further comprising:

decoding the first content information into the albedo component by a first decoder; and decoding the first content information into the shading component by a second decoder.

18. The method of claim 13, wherein the computed losses include any one of a scale-invariant feature transform (SIFT) loss, a sequential consistency loss, a reconstruction loss, a generative adversarial network (GAN) loss, and a cyclic loss.

19. The method of claim 13, further comprising:

predicting, by a predictor network, an estimated image using the synthetic image;

adjusting parameters of the predictor network according to a prediction loss associated with the estimated image; and providing the estimated image to the style model for identifying second content information, wherein the second content information is associated with the first content information.

20. The method of claim 13, wherein generating the synthetic image further includes multiplying values of the albedo component and the shading component and the synthetic image is stylized without the style information and the synthetic style to perceive objects within the input image.

* * * * *